US009995264B2

(12) United States Patent
Gronwald et al.

(10) Patent No.: US 9,995,264 B2
(45) Date of Patent: Jun. 12, 2018

(54) POLE-NICHE-INTEGRATED STARTING-CURRENT LIMITER (71) Applicant: Auto-Kabel Management GmbH, Hausen i.W. (DE)

(72) Inventors: Frank Gronwald, Bedburg (DE); Robert Kampmann, Mönchengladbach (DE); Wacim Tazarine, Mönchengladbach (DE); Simon Betscher, Grevenbroich (DE)

(73) Assignee: Auto-Kabel Management GmbH, Hausen i. W. (DE)

( * ) Notice: Subject to any disclaimer, the term of this patent is extended or adjusted under 35 U.S.C. 154(b) by 329 days.

(21) Appl. No.: 14/899,648

(22) PCT Filed: May 16, 2014

(86) PCT No.: PCT/EP2014/060126
§ 371 (c)(1),
(2) Date: Dec. 18, 2015

(87) PCT Pub. No.: WO2014/202297
PCT Pub. Date: Dec. 24, 2014

(65) Prior Publication Data
US 2016/0138548 A1    May 19, 2016

(30) Foreign Application Priority Data
Jun. 19, 2013 (DE) .................. 10 2013 010 166

(51) Int. Cl.
F02N 11/08 (2006.01)
H01M 2/30 (2006.01)
H01R 11/28 (2006.01)

(52) U.S. Cl.
CPC ........ *F02N 11/087* (2013.01); *F02N 11/0862* (2013.01); *F02N 11/0814* (2013.01);
(Continued)

(58) Field of Classification Search
CPC ............... F02N 11/087; F02N 11/0862; F02N 2250/02; F02N 2300/106; H01R 11/287
See application file for complete search history.

(56) References Cited

U.S. PATENT DOCUMENTS 5,877,563 A    3/1999   Krappel et al. .............. 307/10.1
6,347,030 B1   2/2002   Matsuura ...................... 361/166
(Continued)

FOREIGN PATENT DOCUMENTS

DE   195 03 809 A1   8/1996   ............. B60R 16/02
DE   198 10 954 A1   9/1999   ............. F02N 11/08
(Continued)

OTHER PUBLICATIONS

German Patent Office, German Office Action, Application No. 102011014023.9, dated Dec. 6, 2011, 7 pages (in German).
(Continued)

*Primary Examiner* — Ryan Johnson
(74) *Attorney, Agent, or Firm* — Sunstein Kann Murphy & Timbers LLP (57) ABSTRACT Starting current limitation system 20 having at least a first electrical connection component 30 which can be connected to a battery pole 12, a second electrical connection component 34 which can be connected to a starter 18, and a parallel circuit which is connected between the first connection component 30 and the second connection component 34 and which comprises a branch 24a having a amperage control device 24 and a branch 22a having an electrical resistor 22. An optimization of structural space is achieved when the branch 22a having the electrical resistor 22, the branch 24a having the amperage control device 24 and the first connection component 30 are arranged inside a pole niche 26a of the battery pole 12.

18 Claims, 5 Drawing Sheets (52) U.S. Cl.
CPC .... *F02N 2250/02* (2013.01); *F02N 2300/106* (2013.01); *H01M 2/305* (2013.01); *H01R 11/287* (2013.01)

(56) References Cited

U.S. PATENT DOCUMENTS

| | | | |
|---|---|---|---|
| 6,417,579 | B1 | 7/2002 | Lehnst et al. ................. 307/10.7 |
| 8,896,140 | B2 | 11/2014 | Venkatasubramaniam et al. ........................... 290/38 R |
| 9,422,910 | B2 | 8/2016 | Gronwald ............. F02N 11/087 |
| 9,429,130 | B2 | 8/2016 | Rettig et al. ............ F02N 11/08 |
| 2004/0168664 | A1 | 9/2004 | Senda et al. ............... 123/179.3 |
| 2008/0194152 | A1 | 8/2008 | Roset et al. |
| 2012/0186551 | A1 | 7/2012 | Rentschler et al. ....... 123/179.3 |
| 2012/0200093 | A1 | 8/2012 | Venkatasubramaniam et al. ........................... 290/38 R |
| 2013/0214595 | A1* | 8/2013 | Sierak ................. F02N 11/0862 307/10.6 |
| 2014/0035292 | A1 | 2/2014 | Gronwald ................... 290/38 R |

FOREIGN PATENT DOCUMENTS

| | | | |
|---|---|---|---|
| DE | 198 54 953 C1 | 9/2000 | ............. B60R 16/02 |
| DE | 10 2009 011891 | 11/2009 | ............. H01H 39/00 |
| DE | 10 2008 002 098 A1 | 12/2009 | ............. F02N 11/08 |
| DE | 10 2008 043 546 A1 | 5/2010 | ............. F02N 11/08 |
| DE | 10 2009 028 294 A1 | 2/2011 | ............. F02N 11/08 |
| DE | 10 2009 047 635 A1 | 2/2011 | ................ H02P 1/18 |
| DE | 10 2010 029 919 A1 | 9/2011 | ............. F02N 11/08 |
| DE | 10 2011 014023 | 9/2012 | ............. B60R 16/03 |
| EP | 0 725 412 A2 | 8/1996 | ............. H01H 71/12 |
| GB | 2 383 905 A | 7/2003 | ............. F02N 11/08 |
| JP | 2000-050513 A | 2/2000 | ................ H02J 7/00 |
| WO | WO 1990/09598 A1 | 8/1990 | ............. G01R 31/36 |
| WO | WO 2011/018275 A1 | 2/2011 | ............. F02N 11/08 |
| WO | WO 2012/048969 A1 | 4/2012 | ............. F02N 11/08 |

OTHER PUBLICATIONS

International Searching Authority, International Search Report—International Application No. PCT/EP2012/052581, dated May 24, 2012, together with the Written Opinion of the International Searching Authority, 9 pages.

State Intellectual Property Office of P.R.C., Notification of the First Office Action—Application No. 201280018565.1, dated Jul. 1, 2015, 12 pages (in English).

Mexican Institute of Industrial Property, Office Action—Application No. MX/A/2015/017268, dated May 15, 2017, 3 pages (in Spanish).

Japanese Patent Office, Office Action—Notification of Reason(s) for Refusal: Japanese Filing No. 2016-520330, dated Jan. 24, 2017, 4 pages.

Japanese Patent Office, Office Action—Notification of Reason(s) for Refusal: Japanese Filing No. 2016-520330, dated Jan. 24, 2017, 4 pages (English translation).

International Searching Authority, International Search Report—International Application No. PCT/EP2014/060126, dated Jul. 22, 2014, together with the Written Opinion of the International Searching Authority, 9 pages.

\* cited by examiner

POLE-NICHE-INTEGRATED STARTING-CURRENT LIMITER

The subject-matter relates to a starting current limitation system, in particular for motor vehicles having an internal combustion engine, comprising at least a first electrical connection component which can be connected to a battery pole, a second electrical connection component which can be connected to a starter, and a parallel circuit which is connected between the first connection component and the second connection component and which comprises a branch having an amperage control device and a branch having an electrical resistor.

Internal combustion engines in motor vehicles provide no torque in the stand-still state. For this reason, such internal combustion engines cannot be started independently by the injection of fuel. This means that the internal combustion engine has to be acted on within the vehicle with a torque in order to start it. This torque is generally provided by a starter respectively an electrical machine. Such an electrical machine is required in order to start the internal combustion engine.

The starter of the internal combustion engine is supplied with electrical power by the battery of the motor vehicle. At the time of starting, that is to say, in order to start the starter, the inductive load thereof is low-resistance and a very high current flows from the battery via the starter. The inductivity of the starter at the time of starting almost constitutes a short-circuit. The high current flow brought about by this leads to drops of the battery voltage at the battery poles. In a typical starting operation of a vehicle, the battery voltage falls below a limit value after a short period of time. Consequently, it may be the case that other consumers of the on-board network of the vehicle, which require a minimum voltage, may therefore no longer be able to be supplied with sufficient electrical energy.

The voltage drop occurs in all vehicles with internal combustion engines during the starting operation when the internal combustion engine is started by means of a starter. Vehicles may, for example, be cars, rail vehicles or aircraft. Ships are also motor vehicles within the context of the subject-matter.

In order to prevent this voltage drop during the starting operation, in particular during start-stop operation as has become conventional nowadays in order to save fuel, there are a large number of voltage support concepts, such as, for example, the use of support capacitors, the use of additional batteries and the use of starting current limitation systems.

A starting voltage or starting current limitation system is also known as a Start Voltage Drop Limiter (SEB), Start Current Limiter (SCL), Voltage Drop limiter (VDL) or the like. Such a starting current limitation system limits the start voltage drop by reducing the current which flows from the battery to the starter. In this instance, voltage drops as far as a defined lower limit are further accepted. Furthermore, a start time delay is accepted since the starter does not receive the full available electrical energy of the battery during the starting operation, but instead only a limited amount.

During the starting operation using a conventional battery, the battery voltage falls below 8 Volt after a few milliseconds. This initial voltage drop acts on all the electrical consumers which are connected to the battery. The initial voltage drop which occurs only briefly, could, for example, be compensated for by means of upstream buffer capacitors. In a conventional starting operation, the voltage of the battery briefly recovers directly after starting to above 9 Volt, but only to then fall below 9 Volt again. This second voltage drop cannot be compensated by means of conventional buffer capacitors, since the capacity thereof is sufficient only to compensate for the first voltage drop. The buffer capacitors are regularly discharged after the first voltage drop and the second voltage drop during a starting operation leads to problems within the on-board network. In particular motor control devices and airbag control devices and other control devices may briefly fail since not every control device is configured for such a low voltage level of below 9 Volt.

Starting current limitation systems are generally arranged between the battery and the starter. Conventional on-board network topologies contain a battery, a starter, a generator and a consumer network. Depending on the concept, the starter and the generator are supplied with electrical power by means of a separate line in each case or by means of a combined starter/generator line. In order to prevent short-circuits in the event of a crash, the starter line or the starter generator line is separated from the on-board network in a non-reversible manner by means of a so-called safety battery terminal.

In order to limit the voltage drop at the battery, in addition to the securing in the event of a crash, a starting current limitation system has to be provided.

In a starting current limitation system of the conventional type, a parallel circuit comprising a branch having a resistor and a branch having a switch network, for example, with semi-conductor switches is provided in the starter line. At the time of starting the internal combustion engine, the switch network is opened and current flows exclusively via the resistor. This leads to a limitation of the starting current and a reduction of the voltage drop at the battery terminal. Subsequently, for example, after 100 ms, the parallel branch having the switches is closed. The overall resistance of the parallel circuit decreases and an increased current flows from the battery to the starter. The current via the branch with the switches can be adjusted by means of a type of pulsed operation of the switches by a resistance of this branch which is averaged over time being adjusted by switching the switches on and off in a pulsed manner.

After the starting operation, the switch network can be opened again since the starter no longer requires additional current.

However, the large number of functional components within the starting current limitation system lead to a considerable demand with regard to the structural space available. In particular in the region of the vehicle battery, the structural space available is very limited so that additional functions always involve a structural challenge.

Consequently, an object of the subject-matter was to provide a starting current limitation system which can be integrated in existing structural spaces in a particularly simple manner.

This object is achieved with a starting current limitation system according to claim 1.

According to the subject-matter, it is proposed that, in addition to the branch having the electrical resistor, the branch having the amperage control device and optionally the first connection component are also arranged spatially inside a pole niche of the battery pole.

A battery is generally provided with a standardised pole niche. In particular the DIN standards DIN EN 50342-2 and DIN 72311 indicate standard dimensions for the pole niche and a housing offset of the battery which extends between the pole niches. In this instance, the pole niche is the region which has the battery pole and which is delimited, on the one hand, by side walls of the battery and, on the other hand, outer edges of the battery. The pole niche preferably has a maximum dimension of from 60 mm to 72.5 mm. The height of the pole niche is generally between 30 and 40 mm, preferably below 35 mm. The amperage limitation system is arranged within this structural space, preferably using the longitudinal offset which extends between the pole niches. Of course, the spatial arrangement of the branch comprising the electrical resistor, the branch comprising the amperage control device and the first connection component within the pole niche is intended to be understood in such a manner that this means that these subassemblies are arranged therein for the most part. Should one of these subassemblies be arranged partially outside the pole niche, but the starting current limitation system remains for the most part inside the pole niche, this is included within the meaning of the term spatially inside the pole niche.

The resistor which is used to reduce the starting current at the beginning of the starting operation is preferably low-resistance and may be formed by an integral resistance conductor. This resistance conductor may be formed by a copper alloy, for example, manganin, an iron alloy, for example, high-grade steel and steel, an aluminium alloy or another such metal alloy. The resistor is preferably formed from a strip or a sheet and formed as a flat component. The flat component may be adapted to the structural space conditions in which it is pre-shaped before installation, in particular bent.

In particular, the resistor may be formed in such a manner that at least a portion extends parallel with a boundary wall and/or an outer edge of the pole niche. The resistor can thereby correspond particularly closely to the pole niche or the boundary walls or outer edges thereof. It is also proposed that the resistor be guided in portions along the boundary wall of the pole niche or the outer edge of the pole niche. This means that the resistor is guided with a spacing of between 1 and 10 mm from the boundary wall or the outer edge in portions. This leads to an optimum use of the structural space, since the battery pole terminal and/or the switch network and/or the first connection component and/or the like can be guided in the space surrounded by the resistor.

Preferably, the resistor is formed as a dimensionally stable angled member which gives dimensional stability to the entire subassembly.

A particularly small construction is possible when the resistor is formed as a flat component and the width extent direction thereof extends parallel with a longitudinal axis of the battery pole or the battery pole terminal. Optimum use is then made of the structural height of the pole niche with minimal surface consumption within the pole niche by the resistor when the extent thereof in the width extent direction extends over substantially the structural height of the pole niche.

The resistor is preferably connected to the first connection component. In this instance, the connection can be carried out either directly by means of a short-circuit or via a switch network, in particular formed by semi-conductor switches, as will be set out below. The connection between the resistor and the connection component may be by material bonding. A screw connection is also possible. Other connections, for example, riveting, are also possible.

The first connection component is preferably a battery pole terminal. A battery pole terminal comprises at least two clamping jaws which engage around the pole and can be connected to the pole in a positive-locking manner by means of a screw connection. Tapping may be provided in the clamping jaws, in particular a first tapping for the first connection portion and a second tapping, for example, for connecting the battery pole to the consumer network of the vehicle. This connection, as already explained in the introduction, does not have be secured in such a manner that a voltage drop could occur by it at the battery poles. The second tapping may be located in a space of the pole niche defined by the resistor. The tapping may be arranged between the resistor and the pole terminal.

In order to optimise structural space, it may be advantageous to secure the branch having the resistor and the branch having the amperage control device to the battery pole at different locations, for example, with different radial tapping directions or angled members, in particular at different locations to the battery pole terminal. In order to enable this, the first connection component may not only be monolithic, integral, but also be formed by means of two taps which are arranged spatially separated from each other. A first tap may preferably be connected to the battery pole terminal in a material bond. A second tap may also preferably be connected to the battery pole terminal in a material bond. The two taps may be spatially separated from each other and be electrically connected to each other exclusively via the battery pole terminal. The branch having the amperage control device may be connected to the first tap. The branch having the electrical resistor may be connected to the second tap. The two taps are electrically at the same potential since they are electrically short-circuited with each other via the battery pole terminal. Spatially, however, the taps are separated from each other, for example, arranged so as to face away at different angles from the battery pole terminal so that a structural space optimisation can be achieved.

As mentioned, the first connection component may also be monolithical. In particular, the first connection component may be a current distribution rail. This may, for example, be formed as a flat component. In particular, the flat component of the current distribution rail and the flat component of the resistor may be arranged in such a manner that the width extent directions thereof extend parallel with each other. In particular, this is substantially parallel with the longitudinal extent direction of the battery pole or the battery pole terminal.

Optimum use of the structural space can be ensured in particular when the current distribution rail extends in at least two different planes. A first plane may extend parallel with the longitudinal direction of the battery pole or the battery pole terminal. A second plane may extend perpendicularly to the longitudinal direction of the battery pole or the battery pole terminal. In the region of the second plane, a first connection region may be provided in order to connect the current distribution rail to the battery pole terminal. At an angle to this, in particular at right angles thereto, there may extend the second connection region of the current distribution rail which extends parallel with the longitudinal extent direction of the battery pole. This second connection region may be used for connection to both the branch having the resistor and the branch having the amperage control device. To this end, it is possible to provide, for example, at two distal ends of the second connection region of the current distribution rail a connection either for the branch having the resistor or for the branch having the amperage control device. These two distal ends may be arranged on different members of the current distribution rail, in particular when the current distribution rail is an angled member, in particular a dimensionally stable angled member. The ends of the second connection region may be shaped in such a manner that they engage in a respective housing in which a switch network is provided respectively in order, on the one hand, to connect the current distribution rail to the resistor and, on the other hand, to form the amperage control device. As a result of the respective housings, the switches of the switch networks, which are in particular semi-conductor switches, can be protected from environmental influences.

In particular the second connection region of the current distribution rail may be formed as a flat component. As such, it may extend partially parallel with a boundary wall or an outer edge of the pole niche or be guided along the boundary wall or the outer edge of the pole niche. This leads, on the one hand, to optimal use of the surface and, on the other hand, to the largest possible structural space which is surrounded by the second connection region.

A connection for a generator or a consumer network inside the motor vehicle may be arranged either on the first connection component of the current distribution rail or be provided directly on the battery pole terminal as an additional tap in addition to the tap to the first connection portion.

The adjustment of the amperage when the internal combustion engine is started is carried out by means of switching an amperage control device on and off. During pulsed operation, switches can be switched on and off in order to consequently adjust an averaged resistance of the amperage control device. Semi-conductor switches are particularly suitable for this purpose. In accordance with the required current carrying capacity, one or more semi-conductor switches may be provided parallel with each other in the amperage control device.

After starting up, the starter requires no further current. In order to prevent occurrences of corrosion in the starter line and in order to be able to switch the starter line in a potential-free manner, it is proposed that at least a second switch network is also provided in the branch having the electrical resistor. If, after the starting operation, when the internal combustion engine has already been started, both the first switch network and the second switch network are opened, the line between the starting current limitation system and the starter is completely separated from the battery. This separation is reversible and can be cancelled again during the next starting operation. The switch within the branch with the electrical resistor can also be configured in such a manner that the necessary current-carrying capacity is given at the time of starting up.

As already explained, the maximum current-carrying capacity at the time of start up is intended to be ensured by the switch network in the branch of the electrical resistor. In this regard, the first switch network may be formed from at least two switches which are electrically connected in parallel so that the current-carrying capacity of each individual switch may be smaller.

According to an embodiment, it is proposed that the branch having the amperage control device be arranged primarily inside a first circle segment around the battery pole and that the branch having the electrical resistor be arranged primarily within a second circle segment which is different from the first circle segment around the battery pole. This leads to an optimum use of structural space. Of course, the circle segments may partially intersect as long as a predominant area of the circle segment is not intersecting. That is to say, the branch with the electrical resistor may protrude partially into the first circle segment and vice versa the branch having the amperage control device may protrude partially into the second circle segment.

The features described above and the features described below can be freely combined with each other and may also be inventive alone or in combination with individual features or all of the features of the independent claim.

The subject-matter is explained in greater detail below with reference to drawings which show embodiments. In the drawings.

Figure 1:
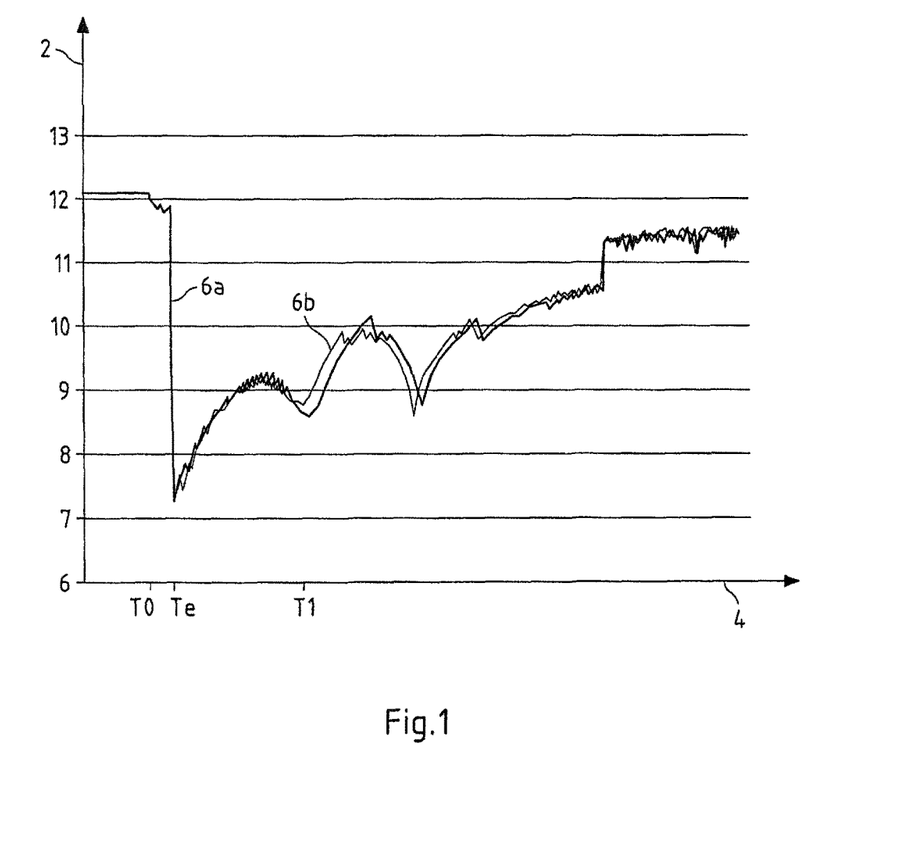
FIG. 1 shows a voltage path on a conventional battery during a start-up operation without starting voltage drop limitation.

FIG. 1 shows the curve of the voltage 2 over a time 4 of approximately 1 second during a start-up operation. Two voltage curves 6a and 6b are shown and are typical of a start-up operation. The voltage curves are preferably tapped between the battery positive pole and the battery negative pole. It can be seen that the voltage curves 6a, 6b are similar to each other. The voltage curves 6a, 6b show the conventional, non-regulated behaviour of a voltage at battery poles in the start-up operation.

It can be seen that, at the time of starting-up at time Te, the voltages drop and the voltage drops below a voltage value of 8 volt. Subsequently, the voltage recovers to then fall below a voltage value of 9 Volt at a time T1 again. Subsequently, the voltage further recovers and reaches the initial value of approximately 12 Volt after approximately 1 second.

The first voltage drop at the time Te can be compensated by means of buffer capacitors in the control devices so that it is not below 9 Volt. Afterwards, however, the buffer capacitors are discharged and, at the latest at the time T1 in the case of the new voltage drop below 9 Volt, consumers in the consumer network of the vehicle would be affected. Malfunctions and failures of consumers may occur. In addition to dropouts of navigation systems and entertainment systems within the vehicle, which are less safety-critical, failures of safety-relevant components may also occur, which it is imperative to avoid. That is to say, in addition to a gain in terms of comfort, safety aspects are also relevant to the starting current limitation.

Figure 2:
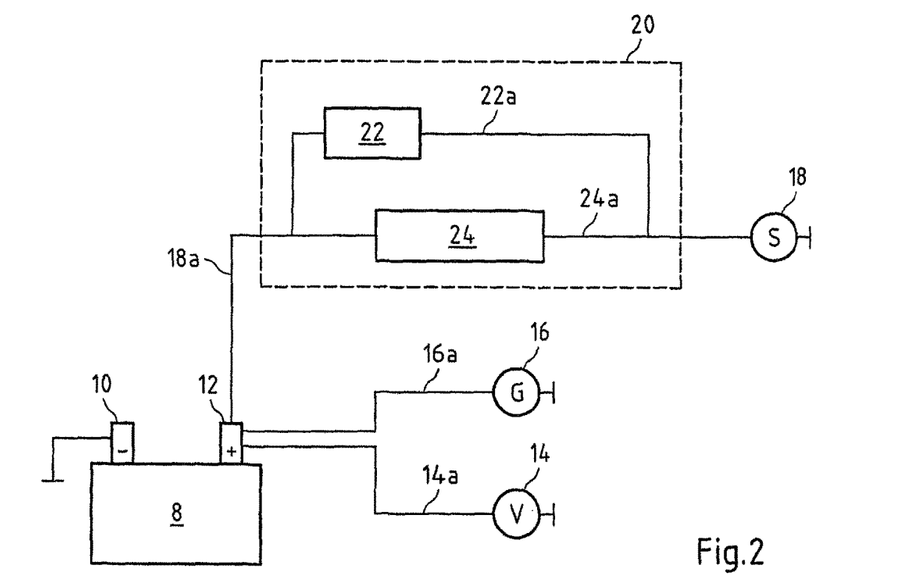
FIG. 2 shows a schematic network topology between battery, starter, generator and consumer with a starting voltage drop limitation.
Figure 3:
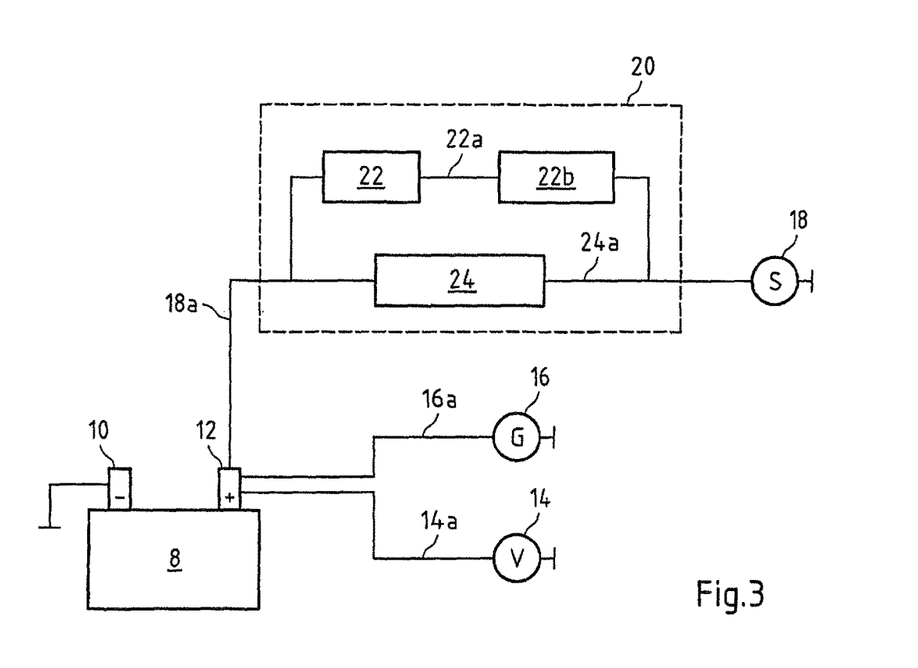
FIG. 3 shows a schematic topology of a starting current limitation system with reversible switching off.

The electrical topology of a starting current limitation system is illustrated by way of example in FIGS. 2 and 3.

FIG. 2 shows a battery 8 with a first battery pole 10 and a second battery pole 12, wherein the pole 12 is preferably the positive pole. From the battery pole 12, a first line 14a branches to a consumer network 14. The consumer network 14 may be formed by comfort functions, such as, for example, air-conditioning system, navigation system, entertainment system and the like, and safety-relevant systems such as, for example, airbag control devices, driver assistance systems, power steering and the like. The consumer network 14 requires from the battery 8 a constant voltage which is regularly above 9 Volt. If the battery voltage drops below such a limit, malfunctions may occur within the consumer network 14. An additional line 16a branches off to a generator 16. The generator 16, also known as a dynamo, constitutes during operation an electrical energy source in order to charge the battery 8.

There is further connected to the pole 12 a line 18a which may also be constructed as a pole terminal and which leads to a starter 18. The starter 18 is an electrical machine which is used to start the internal combustion engine. At the time of starting up, the internal combustion engine has no torque and can be started up only by an external torque which is provided by the starter 18.

The starter 18 is an electrical machine which has a high torque which in the stopped state as an inductive load has only a very low resistance. This means that, via the starter 18, at the time of starting up, a considerable current flows from the battery 8, which can lead to the voltage drops shown in FIG. 1. In order to prevent such voltage drops, there is provided a starting current limitation system 20 which is formed by a branch 22a having a resistor 22 and a branch 24a having a amperage control device 24.

The operation of such a starting current limitation system 20 is known adequately. At the time of starting up, current flows exclusively via the branch 22a. After a short time, for example, 100 ms, the branch 24a is added and a parallel circuit which comprises the resistor 22 and the amperage control device 24 and via which the current flows is formed. The amperage control device 24 may be operated in a pulsed manner so that an averaged resistance is adjusted via the branch 24a. The amperage can thereby be adjusted via the starting current limitation system 20 in such a manner that the voltage at the battery 8 across the poles 10 and 12 does not fall below 9 Volt. A corresponding electronic control system is provided.

FIG. 3 shows a similar topology to that set out in FIG. 2. In addition to the subassemblies used in FIG. 2, an additional switch network 22b is provided in the branch 22a having the resistor 22. The amperage control device 24 and the switch network 22b may be formed by means of semi-conductor switches, in particular semi-conductor switches which are connected in parallel. The switches which are provided in the switch network 22b are closed during the start-up operation. After the start-up operation has ended, the switches of the switch network 22b and the switches of the amperage control device 24 can be completely opened so that the line 18a between the starting current limitation system 20 and starter 18 is potential-free. This prevents corrosion on the line 18a and increases the safety in the event of a crash.

Figure 4A:
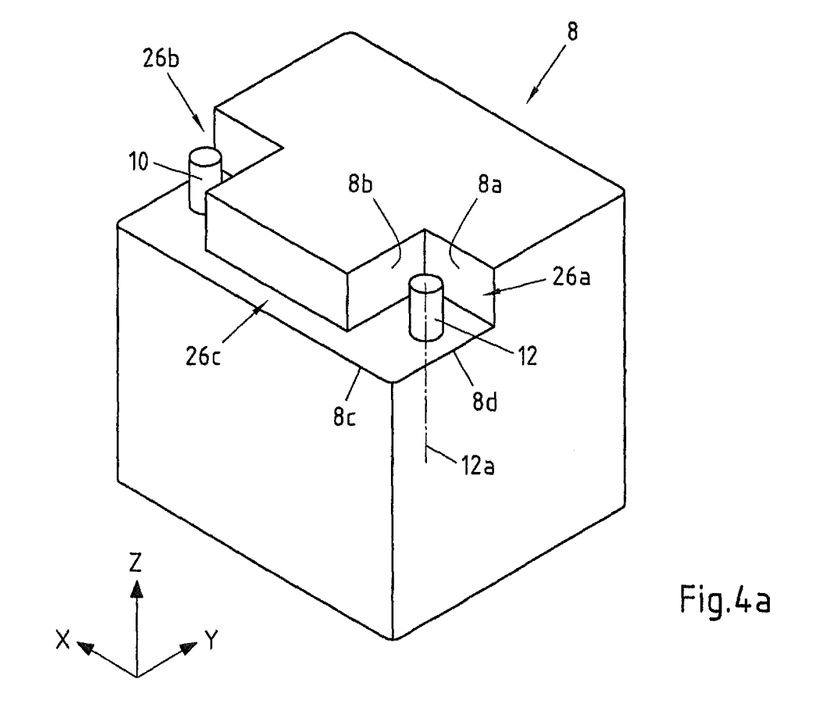
FIG. 4a is a view of a battery pole.

The starting current limitation systems 20 which have been set out have to be installed in the available structural space. According to the invention, it has been recognised that this is possible in the pole niche, preferably the battery positive pole 12. FIG. 4a shows a battery 8 having a pole 12 and a pole 10. The two poles 10, 12 are each surrounded by a pole niche 26a, 26b. The pole niche 26a is delimited by the two boundary walls 8a and 8b of the battery 8 and the outer edges 8c, 8d of the battery 8.

The spatial orientation of the boundary walls 8a, 8b and the outer edges 8c, 8d is illustrated below in the x, y, z coordinate system shown in FIG. 4a. The boundary wall 8a preferably extends parallel with the x-z plane. The boundary wall 8b preferably extends parallel with the y-z plane. The outer edge 8c extends parallel with the x axis and the outer wall 8d extends parallel with the y axis. The longitudinal extent direction 12a of the battery pole 12 or the battery pole terminal extends parallel with the z axis.

Between the pole niche 26a and the pole niche 26b there extends an offset 26c whose volume can also be used in the construction of the starting current limitation system 20.

The structure of the battery 4a substantially corresponds to DIN EN 50342-2.

Figure 4B:
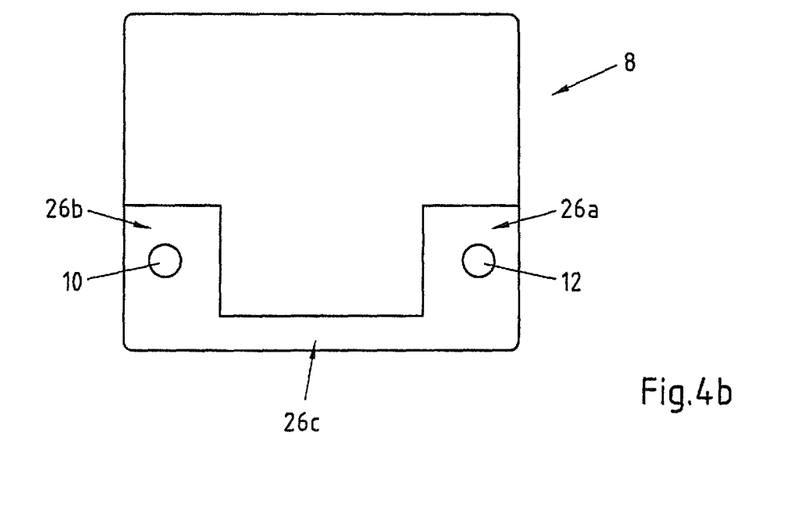
FIG. 4b is a plan view of a battery with battery poles.

The battery according to FIG. 4a is illustrated in FIG. 4b in a plan view. It is possible to see the faces of the pole niches 26a, 26b. The objective starting current limitation system 20 is preferably arranged inside the face of the pole niche 26a and may extend in the face of the offset 26c.

Figure 5:
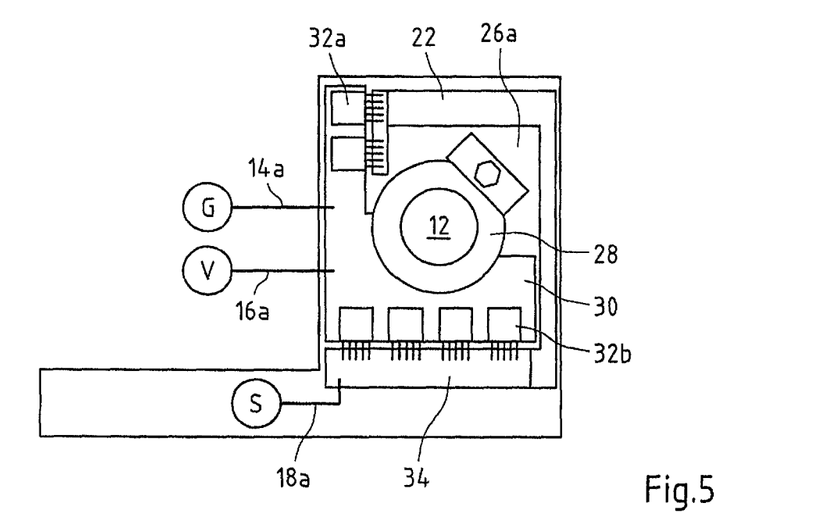
FIG. 5 is a schematic plan view of a spatial arrangement of a starting current limitation system.

FIG. 5 shows the arrangement of a starting current limitation system 20 in the pole niche 26a. It is possible to see that a battery pole terminal 28 is connected to the battery pole 12. A connection component which is constructed as a current distribution rail 30 is connected to the battery pole terminal 28 in a material bond. In the region of the connection between the battery pole terminal 28 and the current distribution rail 30, the current distribution rail 30 may be constructed as a flat member and, for example, extend parallel with the x-y plane. This would be a first electrical tap of the first connection member. The first connection member may extend from this first electrical tap into a second electrical tap, wherein the second electrical tap is arranged in an angled manner with respect to the first electrical tap.

Preferably, the current distribution rail 30 may be constructed as a bent flat member, wherein the second electrical tap which is formed for connection to respective switches 32a, 32b may extend perpendicularly to the x-y plane. Preferably, the second electrical tap extends partially parallel with the x-z plane and partially parallel with the y-z plane. In particular, the region of the second electrical tap which is orientated in the direction of the switch 32a extends parallel with the y-z plane. The region which extends in the direction of the switch 32b is preferably arranged parallel with the x-z plane. The width extent direction of the current distribution rail in the region of the second tap preferably extends parallel with the z direction. An arrangement in a respective plane preferably means that the width extent direction of the respective flat member extends parallel with such a plane.

The switches 32a are semi-conductor switches and correspond to the switches of the switch network 22b. The switches 32a connect the current distribution rail 30 to the resistor 22. The resistor is preferably formed as a dimensionally stable bent angled member. In particular, the resistor 22 is formed as a flat component, wherein the width extent direction thereof extends in the direction of the z axis. A first member of the resistor 22 may extend parallel with the x-z plane. A second member which is angled relative thereto may preferably extend parallel with the y-z plane. Starting from the first member, the resistor 22 extends from the switches 32a to the second connection component 34.

The current distribution rail 30 is connected with the first tap thereof to the switches 32b which are formed for amperage control as required and are controlled accordingly. Via these switches 32b, the current distribution rail 30 is connected to the second connection component 34. Starting from the second connection component 34, the line 18a extends to the starter 18. The electrical connection between the line 18a and the second connection component 34 may extend into the offset 26c.

Figure 6:
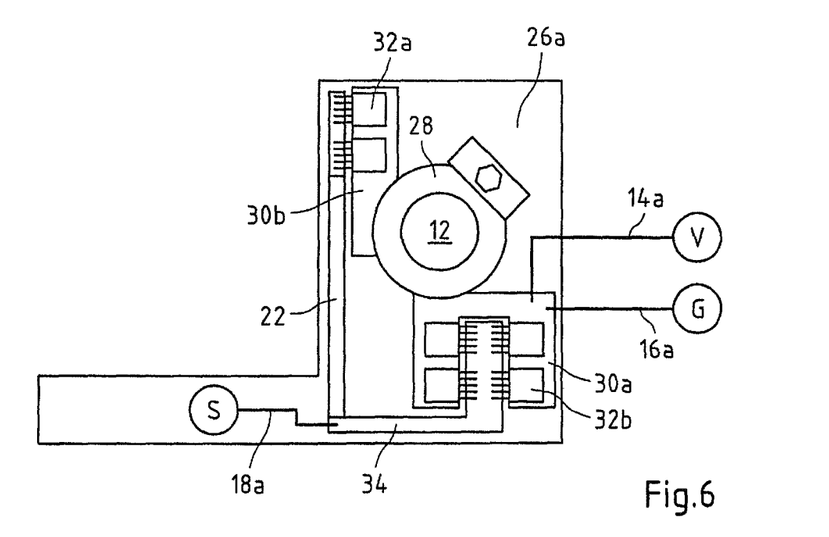
FIG. 6 is a plan view of another spatial arrangement of a starting current limitation system.

FIG. 6 shows another embodiment of an arrangement of a starting current limitation system in a pole niche 26a. It can be seen that, starting from the battery pole terminal 28, the current distribution rail 30 has a first electrical tap 30a which is connected to the battery pole terminal and a second electrical tap 30b which is connected to the battery pole terminal 28. The electrical taps 30a, 30b are both electrically connected to the battery pole terminal 28 but are spatially separated from each other. In contrast, the current distribution rail 30 according to FIG. 5 is integral and connected in each case to a switch network 32a, 32b at the distal ends thereof.

Starting from the first tap 30a which may be constructed as a flat component and which may, for example, be U-shaped, a plurality of switches of the switch network 32b may extend. These switches of the switch network 32b may be connected to an end of a second connection component 34 which engages in the U of the first tap 30a. The first tap 30a, the second tap 30b and/or the battery pole terminal 28 may have connections for the generator line 16a and the line 14a to the consumer network 14.

The second electrical tap 30b may be connected to the resistor 22 by means of a switch network 32a. In this instance, the resistor extends as a flat component parallel with the y-z plane.

As can be seen in FIGS. 5 and 6, the connection between the respective switch network 32a, 32b and the resistor 22 can be constructed in two parts. In particular, the resistor may be formed from a different alloy from the flat components of the switch networks 32a, 32b. The flat components which connect the switch networks 32a, 32b to the resistor are preferably of copper or alloys thereof. The resistor 22 is preferably of a resistance alloy, such as, for example, a copper/manganese alloy with other components comprising nickel, aluminium, tin and/or iron.

Figure 7:
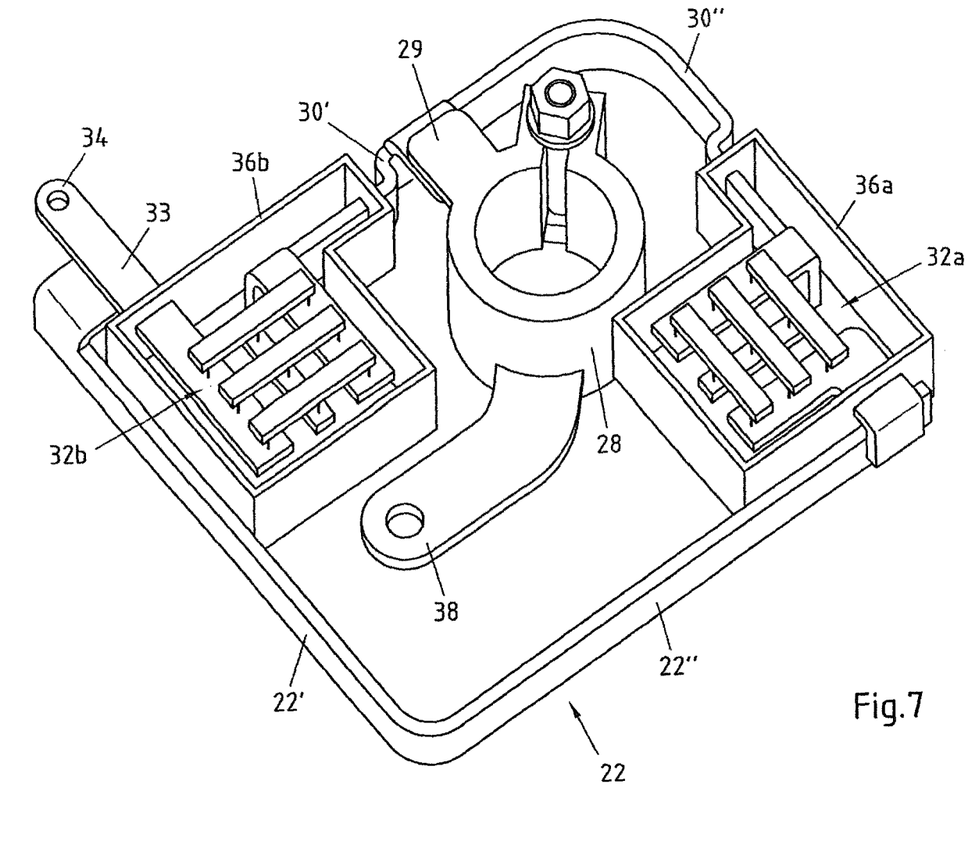
FIG. 7 is a view of a possible arrangement of a starting current limitation system.

FIG. 7 shows another schematic view of a structure of a starting current limitation system 20. It can be seen that, starting from the battery pole terminal 28, there extends an electrical tap 29 which extends parallel with the x-y plane and which is connected to the current distribution rail 30. Starting from this electrical tap 29, the current distribution rail 30 is bent in such a manner that a first end 30' in the assembled state extends parallel with the boundary wall 8b and along the boundary wall 8b. A second end 30" extends parallel with the boundary wall 8a and along it.

The first end 30' opens in a housing 36b in which the switch network 32b is accommodated. Starting from this switch network 32b there extends from the housing 36b an electrical tap 33 which is formed as a flat component and which is connected to the resistor 22 outside the housing 36b. The tap 33 is connected to the connection component 34.

The second end 30" of the current distribution rail 30 extends in a housing 36a in which the switch network 32a is arranged.

The width extent direction of the resistor is parallel with the z axis. A first member 22' of the resistor 22 extends parallel with the x axis in the assembled state. A second member 22" of the resistor extends parallel with the y axis in the assembled state.

The member 22" is connected to an output of the switch network 32a. The member 22' is connected to an output of the switch network 32b.

The resistor 22 is a bent angled member which starting from the member 22' extends into the member 22" which extends at right angles thereto. The member 22' extends parallel with and along the outer edge 8c. The member 22" extends parallel with and along the outer edge 8d. The resistor 22 opens in the second connection component 34.

In the space defined between the members 22' and 22", an electrical tap 38 of the battery pole terminal 28 is provided. Via this electrical tap 38, which is preferably spatially arranged between the battery pole terminal 28 and the resistor 22, a consumer network and/or a generator can be electrically connected to the battery pole 12.

The branch having the resistor 22 extends in the region of the outer edges 8c and 8d, whereas the current distribution rail 30 and the branch having the amperage control device formed by the switch network 32b is arranged in the region of the boundary wall 8b and the outer edge 8c. Consequently, the faces used by the respective branches intersect only partially and the respective branches are mainly arranged in mutually different circle segments around the battery pole 12.

Preferably, the current distribution rail 30 engages around the battery pole 12 in a first circle segment and the resistor 22 engages around the battery pole 12 in a second circle segment.

As a result of the arrangement of the starting current limitation system 20 in the pole niche 26a, a structural space optimisation is achieved with electrical safety being ensured.

The invention claimed is:

1. Starting current limitation system, in particular for motor vehicles having an internal combustion engine, comprising:
at least a first electrical connection component which can be connected to a battery pole;
a second electrical connection component which can be connected to a starter, and
a parallel circuit which is connected between the first electrical connection component and the second electrical connection component and which includes a branch having an amperage control device and a branch having an electrical resistor,
wherein the amperage control device includes a first switch network having semiconductors
wherein the electrical resistor is connected to the first electrical connection component by means of a second switch network, such that the first and the second switch network isolate a connection line between the starter and the starting current limitation system from electric potential at finalization of a starting operation of the starter.

2. Starting current limitation system according to claim 1, wherein the resistor is formed as a flat component.

3. Starting current limitation system according to claim 1, wherein the resistor extends at least partially parallel with a boundary wall and/or an outer edge of the pole niche.

4. Starting current limitation system according to claim 1, wherein the resistor is formed as a dimensionally stable angled member.

5. Starting current limitation system according to claim 1, wherein the resistor is a flat component and the width extent direction thereof extends in portions substantially parallel with a longitudinal axis of the battery pole.

6. Starting current limitation system according to claim 1, wherein the first electrical connection component is a battery pole terminal.

7. Starting current limitation system according to claim 1, wherein the first connection component has at least a first electrical tap which is connected to the battery pole terminal and a second electrical tap which is connected to the battery pole terminal and in that the first tap is connected to the branch having the amperage control device and the second tap is connected to the branch having the electrical resistor.

8. Starting current limitation system according to claim 1, wherein the first electrical connection component has a current distribution rail.

9. Starting current limitation system according to claim 8, wherein the current distribution rail has a first connection region in order to be connected to the battery pole terminal and in that the current distribution rail has a second connection region which extends at angles with respect to the first connection region.

10. Starting current limitation system according to claim 9, wherein the second connection region is formed as a flat component.

11. Starting current limitation system according to claim 9, wherein the second connection region extends at least partially parallel with a boundary wall or an outer edge of the pole niche.

12. Starting current limitation system according to claim 9, wherein the second connection region is formed as a dimensionally stable angled member.

13. Starting current limitation system according to claim 9, wherein the second connection region is a flat component and in the width extent direction thereof extends in portions substantially parallel with a longitudinal axis of the battery pole.

14. Starting current limitation system according to claim 1, wherein the first electrical connection component has an electrical connection for a generator and/or a consumer network of the motor vehicle.

15. Starting current limitation system according to claim 1, wherein the first and/or the second switch network has at least two switches which are electrically connected in parallel.

16. Starting current limitation system according to claim 1, wherein the branch having the amperage control device is arranged primarily inside a first circle segment around the battery pole and in that the branch having the electrical resistor is arranged primarily within a second circle segment which is different from the first circle segment around the battery pole.

17. Starting current limitation system according to claim 1, wherein the resistor is guided in portions along the boundary wall of the pole niche or the outer edge of the pole niche.

18. Starting current limitation system according to claim 9, wherein the second connection region is guided in portions along the boundary wall of the pole niche or the outer edge of the pole niche.

* * * * *